United States Patent
Toyoda

(10) Patent No.: US 10,833,528 B2
(45) Date of Patent: Nov. 10, 2020

(54) UNINTERRUPTIBLE POWER SUPPLY SYSTEM

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 225 days.

(21) Appl. No.: 15/527,856

(22) PCT Filed: Dec. 25, 2014

(86) PCT No.: PCT/JP2014/084227
§ 371 (c)(1),
(2) Date: May 18, 2017

(87) PCT Pub. No.: WO2016/103378
PCT Pub. Date: Jun. 30, 2016

(65) Prior Publication Data
US 2018/0331568 A1    Nov. 15, 2018

(51) Int. Cl.
*H02J 3/38* (2006.01)
*H02J 9/06* (2006.01)
(Continued)

(52) U.S. Cl.
CPC .............. *H02J 9/062* (2013.01); *G06F 1/30* (2013.01); *H02J 3/38* (2013.01); *H02J 9/06* (2013.01); *H02M 7/48* (2013.01); *H02J 15/00* (2013.01)

(58) Field of Classification Search
CPC ....... G06F 1/30; H02J 3/38; H02J 9/06; H02J 9/062; H02J 15/00; H02M 7/48
(Continued)

(56) References Cited

U.S. PATENT DOCUMENTS 6,304,006 B1 * 10/2001 Jungreis .................. H02J 3/38
307/64
2002/0153778 A1 * 10/2002 Oughton, Jr. .......... H02J 9/062
307/64
(Continued)

FOREIGN PATENT DOCUMENTS

CN    102893492 A    1/2013
JP    2005-218200 A   8/2005

OTHER PUBLICATIONS

International Search Report dated Mar. 31, 2015 in PCT/JP2014/084227 filed Dec. 25, 2014.
(Continued)

*Primary Examiner* — Daniel Kessie
*Assistant Examiner* — Brian K Baxter
(74) *Attorney, Agent, or Firm* — Oblon, McClelland, Maier & Neustadt, L.L.P.

(57) ABSTRACT

An uninterruptible power supply system includes a regular uninterruptible power supply device configured to supply AC power to a load, and an auxiliary power conversion device configured to supply AC power to the load when the regular uninterruptible power supply device has a failure. The auxiliary power conversion device includes a converter and an inverter. When a DC voltage generated by the converter is higher than a lower limit voltage, the auxiliary power conversion device outputs an AC voltage having a sinusoidal wave and falling within an acceptable input voltage range of the load. When the DC voltage is lower than the lower limit voltage, the auxiliary power conversion device outputs an AC voltage having waveform distortion within an acceptable range for the load and falling within the acceptable input voltage range of the load.

10 Claims, 10 Drawing Sheets

(51) Int. Cl.
   *G06F 1/30* (2006.01)
   *H02M 7/48* (2007.01)
   *H02J 15/00* (2006.01)
(58) Field of Classification Search
   USPC .......................................................... 307/66
   See application file for complete search history.

(56) References Cited

U.S. PATENT DOCUMENTS

| | | | | |
|---|---|---|---|---|
| 2009/0072623 | A1* | 3/2009 | Liao | H02J 9/061 307/65 |
| 2011/0006607 | A1* | 1/2011 | Kwon | G06F 1/30 307/66 |
| 2011/0068630 | A1* | 3/2011 | Okada | H04B 3/54 307/66 |
| 2011/0278932 | A1* | 11/2011 | Navarro | H02J 9/062 307/66 |
| 2012/0013193 | A1* | 1/2012 | Sato | H02J 9/062 307/80 |
| 2012/0026764 | A1* | 2/2012 | Giuntini | H02J 9/005 363/69 |
| 2012/0217809 | A1* | 8/2012 | Sato | H02J 9/062 307/64 |
| 2015/0035359 | A1* | 2/2015 | Chung | H02J 3/32 307/23 |

OTHER PUBLICATIONS

Extended European Search Report dated Jun. 22, 2018 in Patent Application No. 14908985.6, 7 pages.
Combined Chinese Office Action and Search Report dated May 17, 2019, in Patent Application No. 201480084320.8, 13 pages (with unedited computer generated English translation).
Office Action dated Oct. 16, 2019 in Indian Application No. 201717024865.
Office Action dated Jan. 27, 2020 in counterpart European Application No. 14908985.6.
Office Action dated Mar. 17, 2020 in counterpart Chinese Application No. 201480084320.8, along with an English translation.
Chinese Office Action dated Jun. 12, 2020, issued in Chinese Patent Application No. 201480084320.8 (with English translation).

* cited by examiner (a) VDC2 > VL (b) VDC2 < VL

UNINTERRUPTIBLE POWER SUPPLY SYSTEM

TECHNICAL FIELD

The present invention relates to an uninterruptible power supply system, and in particular to an uninterruptible power supply system including an auxiliary power conversion device configured to supply alternating current (AC) power to a load when a regular uninterruptible power supply device has a failure.

BACKGROUND ART

An uninterruptible power supply system including a regular uninterruptible power supply device and an auxiliary uninterruptible power supply device is disclosed, for example, in Japanese Patent Laying-Open No. 2005-218200 (PTD 1). In a normal state where AC power is supplied from a commercial AC power supply, the regular uninterruptible power supply device converts the AC power from the commercial AC power supply into direct current (DC) power, stores the DC power in a battery and converts the DC power into AC power, and supplies the AC power to a load. In a power failure state where supply of the AC power from the commercial AC power supply is stopped, the regular uninterruptible power supply device converts the DC power in the battery into AC power and supplies the AC power to the load. When the regular uninterruptible power supply device has a failure, the auxiliary uninterruptible power supply device supplies AC power to the load, in place of the regular uninterruptible power supply device. Therefore, operation of the load can be continued even in the power failure state or when the regular uninterruptible power supply device has a failure.

CITATION LIST

Patent Document

PTD 1: Japanese Patent Laying-Open No. 2005-218200

SUMMARY OF INVENTION

Technical Problem

Since a conventional uninterruptible power supply system is provided with regular and auxiliary uninterruptible power supply devices, the system has a larger size and requires a higher cost. Accordingly, it is conceivable to replace the auxiliary uninterruptible power supply device with a power conversion device having a simple configuration which does not use a battery. However, mere replacement of the auxiliary uninterruptible power supply device with a power conversion device having a simple configuration leads to a decrease in an output voltage of the power conversion device when an AC voltage supplied from the AC power supply decreases, and thereby operation of the load is stopped.

Accordingly, a main object of the present invention is to provide a small-sized, low-cost uninterruptible power supply system capable of continuing operation of a load even when an AC voltage supplied from an AC power supply varies.

Solution to Problem

An uninterruptible power supply system in accordance with the present invention includes a regular uninterruptible power supply device and an auxiliary power conversion device. The regular uninterruptible power supply device is configured to convert, in a normal state where AC power is supplied from a first AC power supply, the AC power from the first AC power supply into DC power, store the DC power in a power storage device and convert the DC power into AC power, and supply the AC power to a load. The regular uninterruptible power supply device is configured to convert, in a power failure state where supply of the AC power from the first AC power supply is stopped, the DC power in the power storage device into AC power and supplies the AC power to the load. The auxiliary power conversion device is configured to convert AC power supplied from a second AC power supply into DC power, convert the DC power into AC power, and supply the AC power to the load when the regular uninterruptible power supply device has a failure. The auxiliary power conversion device includes a first converter, a first inverter, and a first control device. The first converter is configured to convert the AC power supplied from the second AC power supply into the DC power. The first inverter is configured to convert the DC power generated by the first converter into the AC power. The first control device is configured to control at least the first inverter, of the first converter and the first inverter, such that, in a first case where a DC voltage generated by the first converter is higher than a predetermined voltage, an output voltage of the auxiliary power conversion device is set to an AC voltage having a sinusoidal waveform and falling within an acceptable input voltage range of the load, and, in a second case where the DC voltage generated by the first converter is lower than the predetermined voltage, the output voltage of the auxiliary power conversion device is set to an AC voltage having waveform distortion within an acceptable range for the load and falling within the acceptable input voltage range of the load.

ADVANTAGEOUS EFFECTS OF INVENTION

Since the uninterruptible power supply system in accordance with the present invention is provided with the auxiliary power conversion device which does not use a power storage device, the size and the cost of the system can be reduced. Further, even when the DC voltage generated by the first converter decreases to be lower than the predetermined voltage, the auxiliary power conversion device generates waveform distortion within the acceptable range for the load in an AC voltage, and outputs the AC voltage within the acceptable input voltage range of the load. Therefore, operation of the load can be continued even when an AC voltage supplied from the second AC power supply varies.

DESCRIPTION OF EMBODIMENTS

First Embodiment

Figure 1:
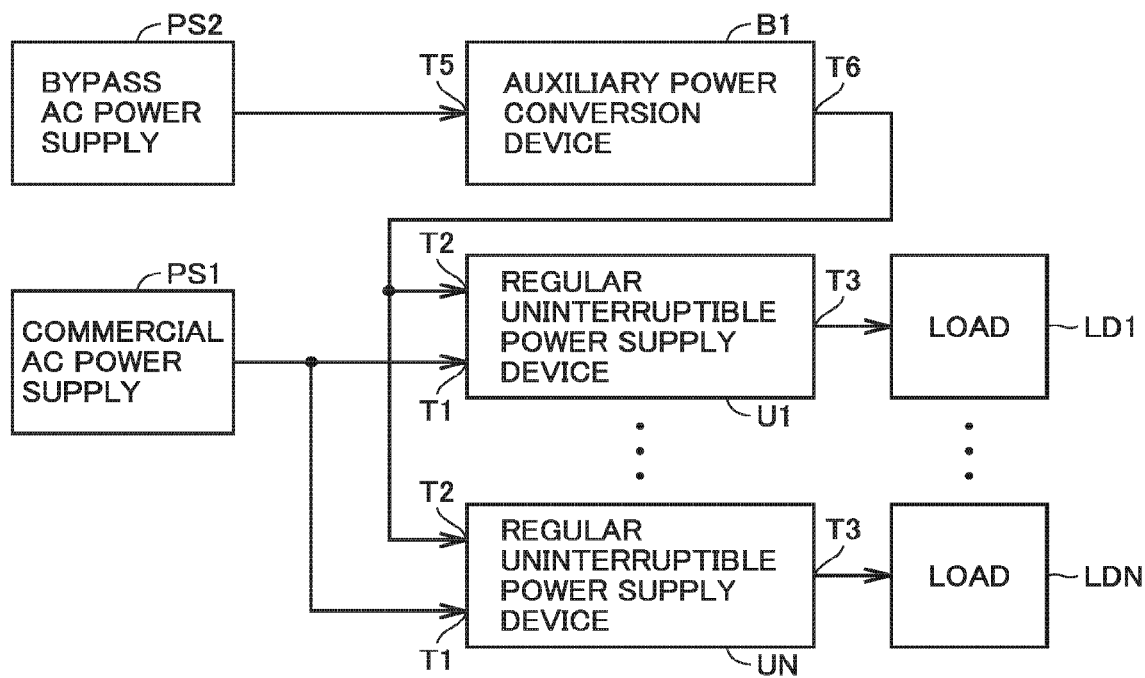
FIG. 1 is a block diagram showing a configuration of an uninterruptible power supply system in accordance with a first embodiment of the present invention.

FIG. 1 is a block diagram showing a configuration of an uninterruptible power supply system in accordance with a first embodiment of the present invention. In FIG. 1, the uninterruptible power supply system includes N regular uninterruptible power supply devices U1 to UN (where N is an integer more than or equal to 1), and an auxiliary power conversion device B1.

In a normal state where AC power is supplied from a commercial AC power supply PS1, a regular uninterruptible power supply device Un (where n is an integer more than or equal to 1 and less than or equal to N) converts the AC power into DC power, stores the DC power in a battery and converts the DC power into AC power, and supplies the AC power to a load LDn. In a power failure state where supply of the AC power from commercial AC power supply PS1 is stopped, regular uninterruptible power supply device Un converts the DC power in the battery into AC power and supplies the AC power to load LDn.

Auxiliary power conversion device B1 converts AC power supplied from a bypass AC power supply PS2 into DC power, converts the DC power into AC power, and, when any regular uninterruptible power supply device Un of regular uninterruptible power supply devices U1 to UN has a failure or is subjected to maintenance check, auxiliary power conversion device B1 supplies the AC power to load LDn, in place of that regular uninterruptible power supply device Un. Therefore, operation of loads LD1 to LDN can be continued even when a power failure occurs or when regular uninterruptible power supply device Un has a failure or is subjected to maintenance check.

Bypass AC power supply PS2 may be of the same type as or a different type from commercial AC power supply PS1. Here, it is assumed that bypass AC power supply PS2 is of the same type as commercial AC power supply PS1. Output voltages of commercial AC power supply PS1 and bypass AC power supply PS2 may vary (increase or decrease) even in the normal state. Although it is preferable to drive load LDn with a rated AC voltage having a sinusoidal waveform with no waveform distortion, it is also possible to drive load LDn with an AC voltage that has waveform distortion as long as it is within a range acceptable for load LDn and that falls within an input voltage range acceptable for load LDn.

Even when the output voltage of commercial AC power supply PS1 varies, regular uninterruptible power supply device Un outputs a rated AC voltage having a sinusoidal waveform with no waveform distortion, using the DC power in the battery. When the output voltage of bypass AC power supply PS2 is sufficiently high, auxiliary power conversion device B1 outputs an AC voltage having a sinusoidal waveform with no waveform distortion and falling within an acceptable input voltage range of load LDn. When the output voltage of bypass AC power supply PS2 decreases, auxiliary power conversion device B1 outputs an AC voltage that has waveform distortion within an acceptable range for load LDn and that is within the acceptable input voltage range of load LDn.

Therefore, since auxiliary power conversion device B1 having a simple configuration which does not use a battery is provided, the size and the cost of the device can be reduced, when compared with a conventional case where an auxiliary uninterruptible power supply device which uses a battery is provided.

Further, even when the output voltage of bypass AC power supply PS2 decreases, auxiliary power conversion device B1 generates waveform distortion within the acceptable range for load LDn in an AC voltage, and outputs the AC voltage within the acceptable input voltage range of load LDn. Therefore, operation of load LDn can be continued even when the AC voltage supplied from bypass AC power supply PS2 varies.

Figure 2:
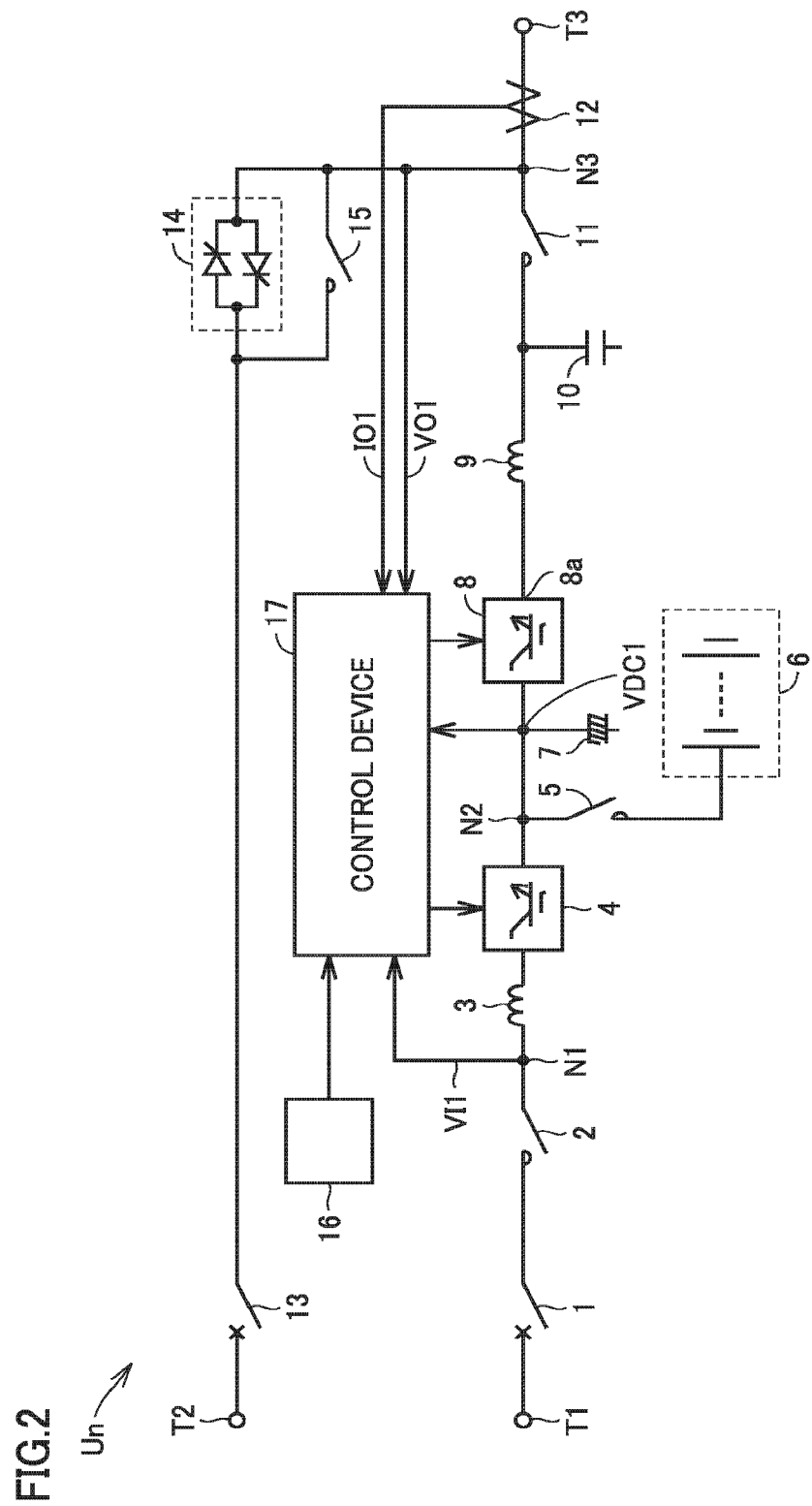
FIG. 2 is a circuit block diagram showing a configuration of a regular uninterruptible power supply device shown in FIG. 1.

FIG. 2 is a circuit block diagram showing a configuration of regular uninterruptible power supply device Un. Although regular uninterruptible power supply device Un converts three-phase AC power from commercial AC power supply PS1 temporarily into DC power, converts the DC power into three-phase AC power, and supplies the three-phase AC power to load LDn, FIG. 2 shows only a circuit for one phase for simplicity of the drawing and the description.

In FIG. 2, regular uninterruptible power supply device Un includes an AC input terminal T1, a bypass input terminal T2, and an AC output terminal T3. AC input terminal T1 receives AC power having a commercial frequency from commercial AC power supply PS1. Bypass input terminal T2 receives AC power having the commercial frequency from auxiliary power conversion device B1. AC output terminal T3 is connected to load LDn. Load LDn is driven with AC power.

Regular uninterruptible power supply device Un further includes breakers 1 and 13, electromagnetic contactors 2, 5, 11 and 15, AC reactors 3 and 9, a converter 4, a battery 6, a smoothing electrolytic capacitor 7, an inverter 8, a capacitor 10, a current detector 12, a semiconductor switch 14, an operating unit 16, and a control device 17.

Breaker 1, electromagnetic contactor 2, and AC reactor 3 are connected in series between AC input terminal T1 and an input node of converter 4. Breaker 1 and electromagnetic contactor 2 are turned on when regular uninterruptible power supply device Un is used, and are turned off for example when regular uninterruptible power supply device Un is subjected to maintenance check. An instantaneous value of an AC input voltage VI1 that appears at a node N1 between electromagnetic contactor 2 and AC reactor 3 is detected by control device 17. Based on the detected value of AC input voltage VI1, whether or not a power failure occurs or the like is determined.

AC reactor 3 constitutes a low-pass filter, passes the AC power having the commercial frequency from commercial AC power supply PS1 to converter 4, and prevents a signal having a switching frequency produced by converter 4 from passing to commercial AC power supply PS1.

Converter 4 is a forward converter controlled by control device 17. In the normal state where the AC power is supplied from commercial AC power supply PS1, converter 4 converts the AC power into DC power, and outputs the DC power to a power supply node N2. An output voltage of converter 4 can be controlled to a desired value. In the power failure state where supply of the AC power from commercial AC power supply PS1 is stopped, operation of converter 4 is stopped. Smoothing electrolytic capacitor 7 is connected to power supply node N2 to smooth a voltage at power supply node N2. An instantaneous value of a DC voltage VDC1 that appears at power supply node N2 is detected by control device 17.

Power supply node N2 is connected to battery 6 via electromagnetic contactor 5. Electromagnetic contactor 5 is turned on when regular uninterruptible power supply device Un is used, and is turned off for example when regular uninterruptible power supply device Un and battery 6 are subjected to maintenance check. Battery (power storage device) 6 stores the DC power generated by converter 4. A capacitor may be connected instead of battery 6.

Inverter 8 is a reverse converter controlled by control device 17. Inverter 8 converts the DC power generated by converter 4 or the DC power in battery 6 into AC power having the commercial frequency, and outputs the AC power to an output node 8a. That is, in the normal state, inverter 8 converts the DC power supplied from converter 4 via power supply node N2 into AC power, and in the power failure state, inverter 8 converts the DC power supplied from battery 6 into AC power. An output voltage of inverter 8 can be controlled to a desired value.

Output node 8a of inverter 8 is connected to one terminal of electromagnetic contactor 11 via AC reactor 9, and the other terminal (a node N3) of electromagnetic contactor 11 is connected to AC output terminal T3. Capacitor 10 is connected to the one terminal of electromagnetic contactor 11. AC reactor 9 and capacitor 10 constitute a low-pass filter, passes the AC power having the commercial frequency generated by inverter 8 to AC output terminal T3, and prevents a signal having a switching frequency produced by inverter 8 from passing to AC output terminal T3.

Electromagnetic contactor 11 is controlled by control device 17. Electromagnetic contactor 11 is turned on in an inverter power-feed mode in which the AC power generated by inverter 8 is supplied to load LDn, and is turned off in a bypass power-feed mode in which the AC power from auxiliary power conversion device B1 is supplied to load LDn.

An instantaneous value of an AC output voltage VO1 that appears at node N3 is detected by control device 17. Current detector 12 detects a load current IO1 flowing between node N3 and AC output terminal T3, and provides a signal indicating the detected value to control device 17.

Breaker 13 and semiconductor switch 14 are connected in series between bypass input terminal T2 and node N3. Breaker 13 is turned on when regular uninterruptible power supply device Un is used, and is turned off for example when regular uninterruptible power supply device Un is subjected to maintenance check. Semiconductor switch 14 includes a thyristor, and is controlled by control device 17. Semiconductor switch 14 is normally turned off, and is turned on instantaneously when inverter 8 has a failure, to supply the AC power from auxiliary power conversion device B1 to load LDn. Semiconductor switch 14 is turned off after a predetermined time elapses since it is turned on.

Electromagnetic contactor 15 is connected in parallel with semiconductor switch 14, and is controlled by control device 17. Electromagnetic contactor 15 is turned off in the inverter power-feed mode in which the AC power generated by inverter 8 is supplied to load LDn, and is turned on in the bypass power-feed mode in which the AC power from auxiliary power conversion device B1 is supplied to load LDn. Further, when inverter 8 has a failure, electromagnetic contactor 15 is turned on to supply the AC power from auxiliary power conversion device B1 to load LDn. That is, when inverter 8 has a failure, semiconductor switch 14 is turned on instantaneously for a predetermined time, and electromagnetic contactor 15 is also turned on, to prevent semiconductor switch 14 from being overheated and damaged.

Operating unit 16 includes a plurality of buttons to be operated by a user of the uninterruptible power supply system, an image display unit for displaying various information, and the like. Through the user's operation of operating unit 16, the user can power on/off uninterruptible power supply device Un, select either of the bypass power-feed mode and the inverter power-feed mode, and store various parameters in control device 17.

Control device 17 operates based on a signal from operating unit 16, detects instantaneous values of AC input voltage VI1, DC voltage VDC1, AC output voltage VO1, and load current IO1, and controls entire uninterruptible power supply device Un based on these detected values. That is, control device 17 detects whether or not a power failure occurs based on the detected value of AC input voltage VI1, and controls converter 4 and inverter 8 in synchronization with a phase of AC input voltage VI1.

Further, control device 17 controls converter 4 such that DC voltage VDC1 is set to a desired target DC voltage VDCT1. Further, control device 17 controls inverter 8 such that output voltage VO1 changes to have a sinusoidal wave with no waveform distortion and is set to a rated voltage. Further, control device 17 controls inverter 8 such that a phase of output voltage VO1 matches the phase of input voltage VI1.

Figure 3:
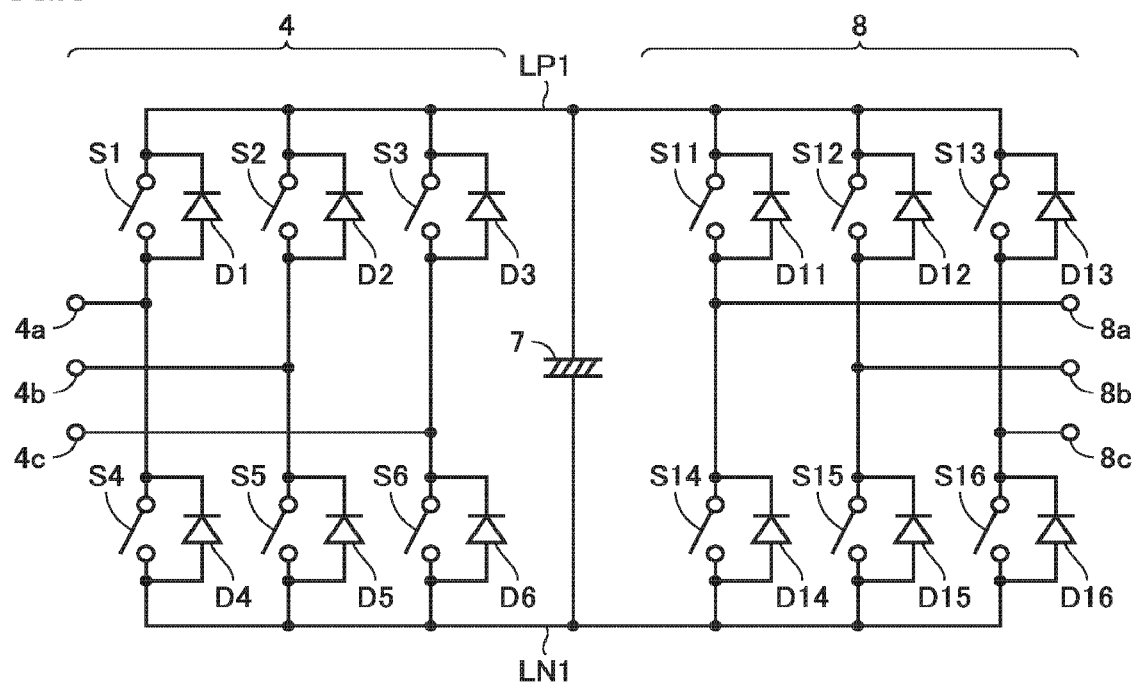
FIG. 3 is a circuit diagram showing a configuration of a converter and an inverter shown in FIG. 2.

FIG. 3 is a circuit diagram showing a configuration of converter 4 and inverter 8. In FIG. 3, converter 4 includes input nodes 4a to 4c, switching elements S1 to S6, and diodes D1 to D6, and inverter 8 includes switching elements S11 to S16, diodes D11 to D16, and output nodes 8a to 8c.

Input nodes 4a to 4c of converter 4 receive three-phase AC voltages from commercial AC power supply PS1, respectively. Switching elements S1 to S3 have one electrodes connected to a DC positive bus LP1, and the other electrodes connected to input nodes 4a to 4c, respectively. Switching elements S4 to S6 have one electrodes connected to input nodes 4a to 4c, respectively, and the other electrodes connected to a DC negative bus LN1. Diodes D1 to D6 are connected in anti-parallel with switching elements S1 to S6, respectively. Smoothing electrolytic capacitor 7 is connected between DC positive bus LP1 and DC negative bus LN1 to smooth DC voltage VDC1 between buses LP1 and LN1.

Switching elements S11 to S13 of inverter 8 have one electrodes connected to DC positive bus LP1, and the other electrodes connected to output nodes 8a to 8c, respectively. Switching elements S14 to S16 have one electrodes connected to output nodes 8a to 8c, respectively, and the other electrodes connected to DC negative bus LN1. Diodes D11 to D16 are connected in anti-parallel with switching elements S11 to S16, respectively.

Each of switching elements S1 to S6 and S11 to S16 is controlled by control device 17, and is turned on/off at a predetermined timing in synchronization with a three-phase AC voltage VI from commercial AC power supply PS1. Switching elements S1 to S3 are turned on/off in synchronization with three-phase AC voltage VI1 and when switching elements S1 to S3 are turned on/off, switching elements S4 to S6 are turned off/on, respectively. Switching elements S11 to S13 are turned on/off in synchronization with three-phase AC voltage VI1 and when switching elements S11 to S13 are turned on/off, switching elements S14 to S16 are turned off/on, respectively.

By adjusting a phase difference between three-phase AC voltage VI1 from commercial AC power supply PS1 and the timing at which switching elements S1 to S6 are turned on/off, DC voltage VDC1 can be adjusted to a desired voltage. Further, by adjusting the time at which each of switching elements S11 to S16 is turned on, output voltage VO1 can be adjusted to a desired voltage.

Control device 17 turns on/off each of switching elements S1 to S6 of converter 4 such that DC voltage VDC1 is set to predetermined target voltage VDCT1, and turns on/off each of switching elements S11 to S16 of inverter 8 such that output voltage VO1 is set to a rated AC voltage having a sinusoidal waveform with no waveform distortion. Output voltage VO1 is set to have an amplitude having a value smaller than VDCT1/2. Further, control device 17 turns on/off each of switching elements S11 to S16 of inverter 8 such that the phase of output voltage VO1 matches the phase of input voltage VI1.

Here, operation of regular uninterruptible power supply device Un will be described. In the normal state where the AC power is supplied from commercial AC power supply PS1, breakers 1 and 13 and electromagnetic contactors 2, 5, and 11 are turned on, and semiconductor switch 14 and electromagnetic contactor 15 are turned off. The AC power supplied from commercial AC power supply PS1 is converted into DC power by converter 4. The DC power generated by converter 4 is stored in battery 6, and is converted into AC power by inverter 8, and the AC power is supplied to load LDn.

Output voltage VO1 of regular uninterruptible power supply device Un is maintained at a rated AC voltage having a sinusoidal waveform with no waveform distortion. Even when the output voltage of commercial AC power supply PS1 decreases temporarily, voltage VDC1 at power supply node N2 is maintained at a constant voltage by battery 6, and output voltage VO1 is maintained at the rated AC voltage having a sinusoidal waveform.

In the power failure state where supply of the AC power from commercial AC power supply PS1 is stopped, operation of converter 4 is stopped, and the DC power in battery 6 is supplied to inverter 8. Inverter 8 converts the DC power supplied from battery 6 into AC power, and supplies the AC power to load LDn. Therefore, even when a power failure occurs, operation of load LDn can be continued for a period in which the DC power is stored in battery 6.

When inverter 8 has a failure in the normal state, semiconductor switch 14 is turned on instantaneously, and the AC power is supplied from auxiliary power conversion device B1 to load LDn via semiconductor switch 14. Then, electromagnetic contactor 15 is turned on and electromagnetic contactor 11 is turned off, and semiconductor switch 14 is turned off. Thereby, the AC power is supplied from auxiliary power conversion device B1 to load LDn via electromagnetic contactor 15. It should be noted that, since a phase of an output voltage of auxiliary power conversion device B1 is in synchronization with the phase of output voltage VO1 of each of regular uninterruptible power supply devices U1 to UN, no overcurrent flows when semiconductor switch 14 is turned on.

Figure 4:
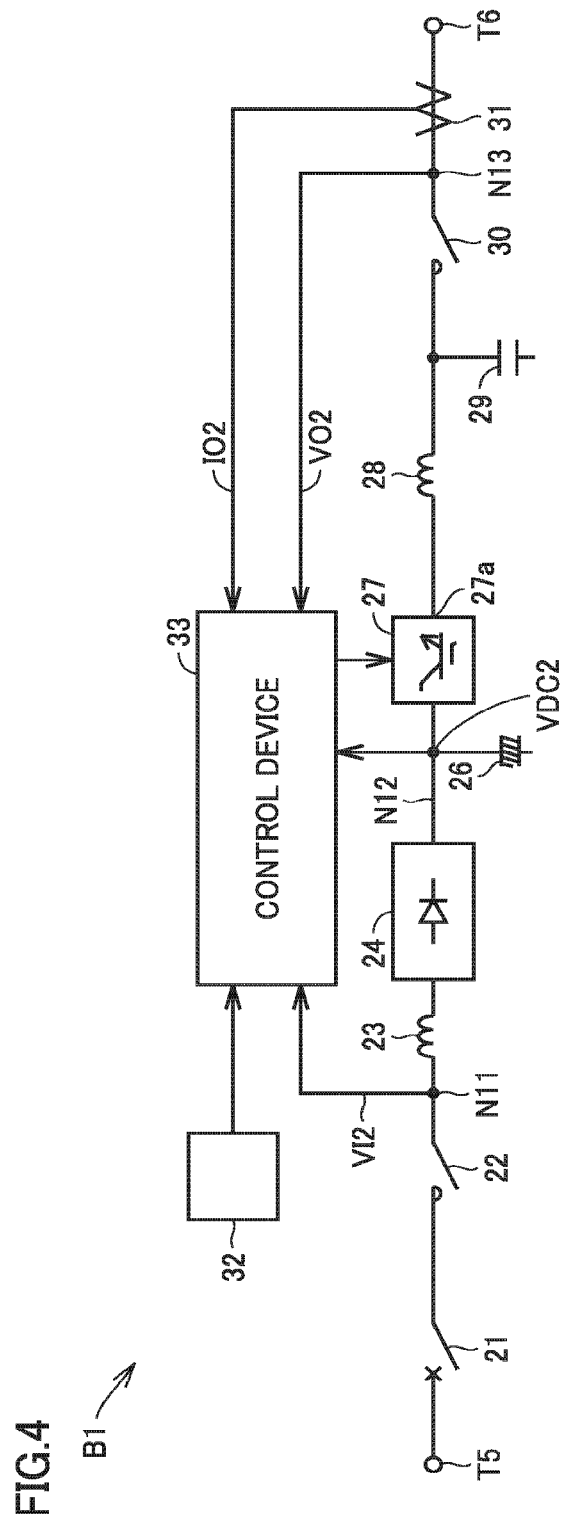
FIG. 4 is a circuit block diagram showing a configuration of an auxiliary power conversion device shown in FIG. 1.

FIG. 4 is a circuit block diagram showing a configuration of auxiliary power conversion device B1. Although auxiliary power conversion device B1 converts three-phase AC power from bypass AC power supply PS2 temporarily into DC power, converts the DC power into three-phase AC power, and supplies the three-phase AC power to each of regular uninterruptible power supply devices U1 to UN, FIG. 4 shows only a circuit for one phase for simplicity of the drawing and the description.

In FIG. 4, auxiliary power conversion device B1 includes an AC input terminal T5 and an AC output terminal T6. AC input terminal T5 receives AC power having the commercial frequency from bypass AC power supply PS2. AC output terminal T6 is connected to bypass input terminals T2 of regular uninterruptible power supply devices U1 to UN.

Auxiliary power conversion device B1 further includes a breaker 21, electromagnetic contactors 22 and 30, AC reactors 23 and 28, a converter 24, a smoothing electrolytic capacitor 26, an inverter 27, a capacitor 29, a current detector 31, an operating unit 32, and a control device 33.

Breaker 21, electromagnetic contactor 22, and AC reactor 23 are connected in series between AC input terminal T5 and an input node of converter 24. Breaker 21 and electromagnetic contactor 22 are turned on when auxiliary power conversion device B1 is used, and are turned off for example when auxiliary power conversion device B1 is subjected to maintenance check. An instantaneous value of an AC input voltage VI2 that appears at a node N11 between electromagnetic contactor 22 and AC reactor 23 is detected by control device 33.

AC reactor 23 constitutes a low-pass filter, passes the AC power having the commercial frequency from bypass AC power supply PS2 to converter 24, and prevents a signal having a switching frequency produced by converter 24 from passing to bypass AC power supply PS2.

Converter 24 is a rectifier, and it converts the AC power into DC power, and outputs the DC power to a power supply node N12. An output voltage of converter 24 varies according to the output voltage of bypass AC power supply PS2. Smoothing electrolytic capacitor 26 is connected to power supply node N12 to smooth a voltage at power supply node N12. An instantaneous value of a DC voltage VDC2 that appears at power supply node N12 is detected by control device 33.

Inverter 27 is a reverse converter controlled by control device 33. Inverter 27 converts the DC power generated by converter 24 into AC power having the commercial frequency, and outputs the AC power to an output node 27a. An output voltage of inverter 27 can be controlled to a desired value.

Output node 27a of inverter 27 is connected to one terminal of electromagnetic contactor 30 via AC reactor 28, and the other terminal (a node N13) of electromagnetic contactor 30 is connected to AC output terminal T6. Capacitor 29 is connected to the one terminal of electromagnetic contactor 30. AC reactor 28 and capacitor 29 constitute a low-pass filter, passes the AC power having the commercial frequency generated by inverter 27 to AC output terminal T6, and prevents a signal having a switching frequency produced by inverter 27 from passing to AC output terminal T6.

Electromagnetic contactor 30 is turned on when auxiliary power conversion device B1 is used, and is turned off for example when auxiliary power conversion device B1 is subjected to maintenance check. An instantaneous value of an AC output voltage VO2 that appears at node N13 is detected by control device 33. Current detector 31 detects a load current I02 flowing between node N13 and AC output terminal T6, and provides a signal indicating the detected value to control device 33.

Operating unit 32 includes a plurality of buttons to be operated by the user of the uninterruptible power supply system, an image display unit for displaying various information, and the like. Through the user's operation of operating unit 32, the user can power on/off auxiliary power conversion device B1, and store various parameters in control device 33.

Control device 33 operates based on a signal from operating unit 32, detects instantaneous values of AC input voltage VI2, DC voltage VDC2, AC output voltage VO2, and load current I02, and controls entire auxiliary power conversion device B1 based on these detected values. That is, control device 33 controls inverter 27 such that a phase of output voltage VO2 matches a phase of input voltage VI2. Since it is herein assumed that bypass AC power supply PS2 is of the same type as commercial AC power supply PS1, the phase of output voltage VO2 of auxiliary power conversion device B1 matches the phase of output voltage VO1 of each of regular uninterruptible power supply devices U1 to UN.

Further, when DC voltage VDC2 at power supply node N12 is higher than a predetermined lower limit voltage VL, control device 33 controls inverter 27 such that AC voltage VO2 having a sinusoidal waveform with no waveform distortion and falling within an acceptable input voltage range of load LDn is output. Further, when DC voltage VDC2 at power supply node N12 is lower than predetermined lower limit voltage VL, control device 33 controls inverter 27 such that AC voltage VO2 having waveform distortion within an acceptable range for load LDn and falling within the acceptable input voltage range of load LDn is output. Lower limit voltage VL is a minimum DC voltage required for auxiliary power conversion device B1 to output an AC voltage VO having a lower limit value of the acceptable input voltage range of load LDn.

Figure 5:
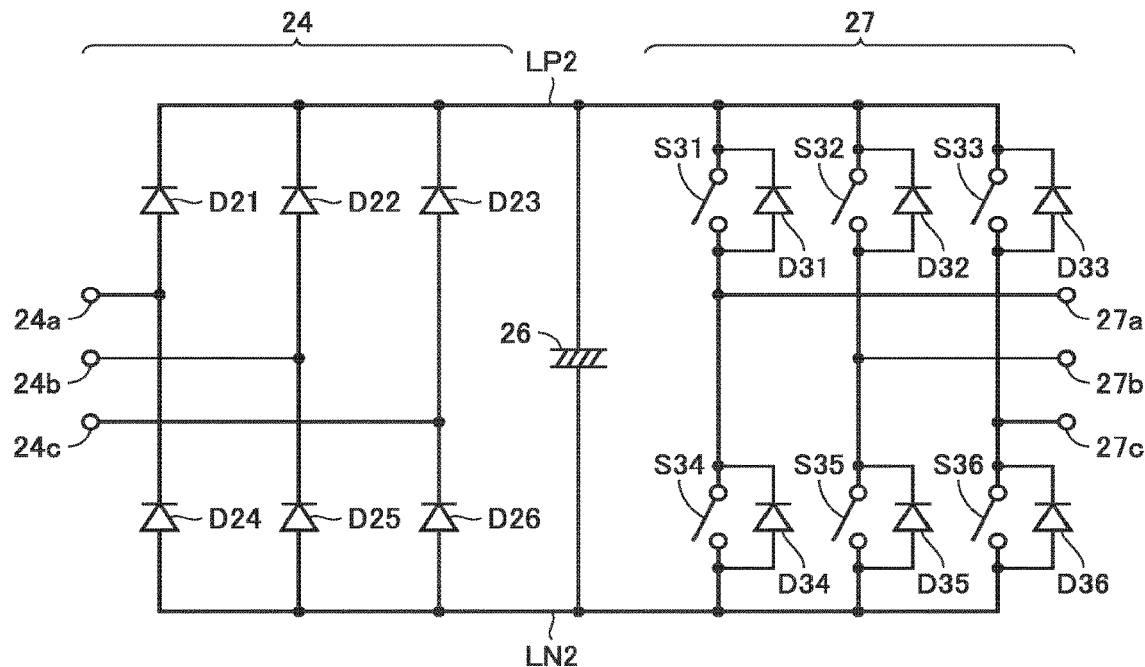
FIG. 5 is a circuit diagram showing a configuration of a converter and an inverter shown in FIG. 4.

FIG. 5 is a circuit diagram showing a configuration of converter 24 and inverter 27. In FIG. 5, converter 24 includes input nodes 24a to 24c and diodes D21 to D26, and inverter 27 includes switching elements S31 to S36, diodes D31 to D36, and output nodes 27a to 27c.

Input nodes 24a to 24c of converter 24 receive three-phase AC voltages from bypass AC power supply PS2, respectively. Diodes D21 to D23 have anodes connected to input nodes 24a to 24c, respectively, and cathodes connected to a DC positive bus LP2. Diodes D24 to D26 have anodes connected to a DC negative bus LN2, and cathodes connected to input nodes 24a to 24c, respectively. The three-phase AC voltage from bypass AC power supply PS2 is full-wave rectified by diodes D21 to D26 and converted into DC voltage VDC2. Smoothing electrolytic capacitor 26 is connected between DC positive bus LP2 and DC negative bus LN2 to smooth DC voltage VDC2 between buses LP2 and LN2.

Switching elements S31 to S33 of inverter 27 have one electrodes connected to DC positive bus LP2, and the other electrodes connected to output nodes 27a to 27c, respectively. Switching elements S34 to S36 have one electrodes connected to output nodes 27a to 27c, respectively, and the other electrodes connected to DC negative bus LN2. Diodes D31 to D36 are connected in anti-parallel with switching elements S31 to S36, respectively.

Each of switching elements S31 to S36 is controlled by control device 33, and is turned on/off at a predetermined timing in synchronization with three-phase AC voltage VI2 from bypass AC power supply PS2. Switching elements S31 to S33 are turned on/off in synchronization with three-phase AC voltage VI2, and when switching elements S31 to S33 are turned on/off, switching elements S34 to S36 are turned off/on, respectively. By adjusting the time at which each of switching elements S31 to S36 is turned on, output voltage VO2 can be adjusted to a desired voltage.

Control device 33 turns on/off each of switching elements S31 to S36 such that the phase of output voltage VO2 matches the phase of input voltage VI2. Further, when DC voltage VDC2 at power supply node N12 is higher than lower limit voltage VL, control device 33 turns on/off each of switching elements S31 to S36 such that AC voltage VO2 having a sinusoidal waveform with no waveform distortion and falling within the acceptable input voltage range of load LDn is output.

Further, when DC voltage VDC2 at power supply node N12 is lower than lower limit voltage VL, control device 33 turns on/off each of switching elements S31 to S36 such that AC voltage VO2 having waveform distortion within the acceptable range for load LDn and falling within the acceptable input voltage range of load LDn is output.

Figure 6:
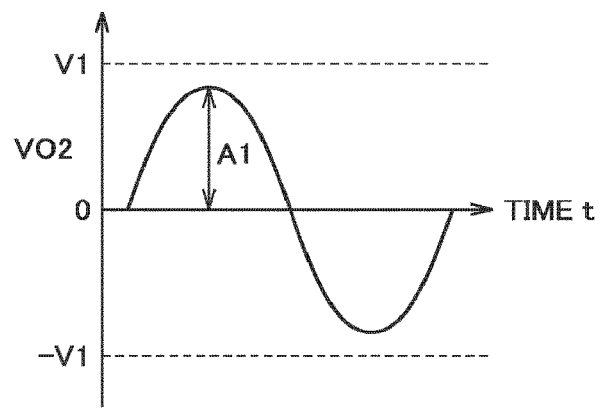
FIG. 6 is a time chart showing operation of the auxiliary power conversion device shown in FIG. 4.
Figure 6:
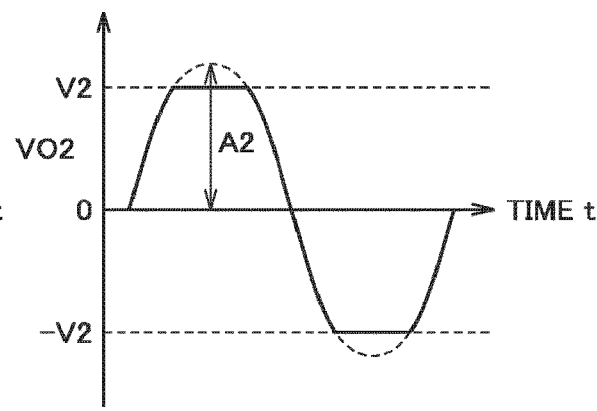

FIGS. 6(a) and 6(b) are time charts each showing a waveform of output voltage VO2 of auxiliary power conversion device B1. FIG. 6(a) shows the waveform of output voltage VO2 when DC voltage VDC2 is higher than lower limit voltage VL, and FIG. 6(b) shows the waveform of output voltage VO2 when DC voltage VDC2 is lower than lower limit voltage VL.

As shown in FIG. 6(a), in the case of VDC2>VL, DC voltage VDC2 is set to a voltage 2×V1 at a level according to input voltage VI2. Control device 33 controls inverter 27 to output AC voltage VO2 that having a sinusoidal waveform whose amplitude has a predetermined value A1 smaller than V1. Output voltage VO2 is maintained at a voltage within the acceptable input voltage range of load LDn. In this case, since DC voltage V1 is larger than amplitude A1 of AC voltage VO2, output voltage VO2 has a sinusoidal waveform with no distortion.

As shown in FIG. 6(b), in the case of VDC2<VL, DC voltage VDC2 is set to a voltage 2×V2 at a level according to input voltage VI2, where V2<V1. In this case, if control device 33 controls inverter 27 to output AC voltage VO2 that having a sinusoidal waveform whose amplitude has a predetermined value smaller than V2, output voltage VO2 decreases to be lower than the lower limit value of the acceptable input voltage range of load LDn.

Accordingly, control device 33 controls inverter 27 to output AC voltage VO2 having a sinusoidal waveform whose amplitude has a predetermined value A2 larger than V2. In this case, since DC voltage V2 is smaller than amplitude A2 of AC voltage VO2, output voltage VO2 is limited within the range of −V2 to +V2, and output voltage VO2 has a trapezoidal waveform instead of a sinusoidal waveform. With the same amplitude, a voltage value of an AC voltage having a trapezoidal waveform is larger than a voltage value (effective value) of an AC voltage having a sinusoidal waveform. Therefore, output voltage VO2 can be maintained at a voltage within the acceptable input voltage range of load LDn.

Figure 7:
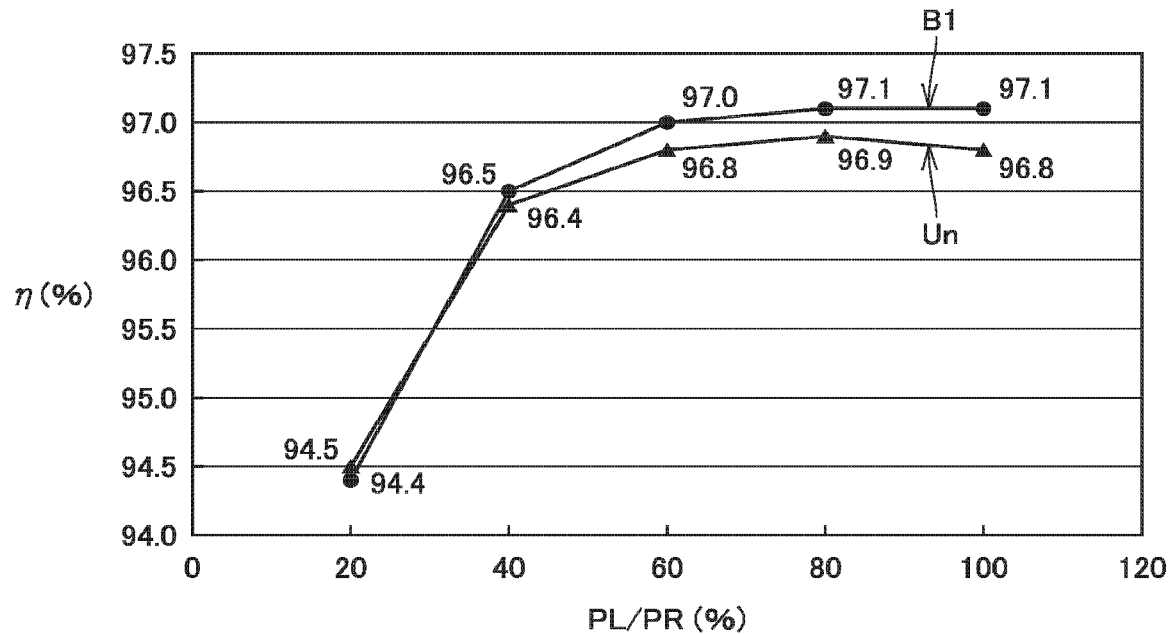
FIG. 7 is a view for comparing an efficiency of the regular uninterruptible power supply device and an efficiency of the auxiliary power conversion device shown in FIG. 1.

FIG. 7 is a view for comparing an efficiency η (%) of regular uninterruptible power supply device Un and an efficiency η (%) of auxiliary power conversion device B1. The axis of abscissas in FIG. 7 represents a ratio PL/PR (%) of a load capacity PL to a rated capacity PR of device Un, B1. The axis of ordinates in FIG. 7 represents efficiency η (%) of device Un, B1. Efficiency η is a ratio PO/PI (%) of AC power PO supplied to load LDn to AC power PI supplied from AC power supply PS1, PS2. In regular uninterruptible power supply device Un, when PL/PR was set to 20, 40, 60, 80, and 100%, efficiencies η of 94.5, 96.4, 96.8, 96.9, and 96.8% were obtained, respectively.

In contrast, in auxiliary power conversion device B1, when PL/PR was set to 20, 40, 60, 80, and 100%, efficiencies η of 94.4, 96.5, 97.0, 97.1, and 97.1% were obtained, respectively. That is, in a normal use range in which PL/PR was 40 to 100%, efficiency η of auxiliary power conversion device B1 was higher than efficiency η of regular uninterruptible power supply device Un. This is because, in regular uninterruptible power supply device Un, switching loss and conduction loss occur in switching elements S1 to S6 of converter 4, whereas in auxiliary power conversion device B1, converter 24 does not include a switching element. Therefore, higher efficiency η is obtained when using auxiliary power conversion device B1 than when providing an auxiliary uninterruptible power supply device as in a conventional case.

Next, operation of the uninterruptible power supply system shown in FIGS. 1 to 7 will be described. It is assumed that, in an initial state, regular uninterruptible power supply devices U1 to UN and auxiliary power conversion device B1 are normal, and AC power is supplied from each of commercial AC power supply PS1 and bypass AC power supply PS2.

In this case, in each regular uninterruptible power supply device Un, the AC power supplied from commercial AC power supply PS1 is converted into DC power, and the DC power is stored in battery 6, and is converted into AC power, and the AC power is supplied to load LDn. Output voltage VO1 of each regular uninterruptible power supply device Un is set to an AC voltage that having a sinusoidal waveform with no waveform distortion, and is maintained at a constant rated voltage.

Even when output voltage VI1 of commercial AC power supply PS1 decreases temporarily, DC voltage VDC1 at power supply node N2 is maintained constant by battery 6, and output voltage VO1 of each regular uninterruptible power supply device Un is maintained at the constant rated voltage. Each load LDn is driven with the AC power supplied from corresponding regular uninterruptible power supply device Un.

In auxiliary power conversion device B1, the AC power supplied from bypass AC power supply PS2 is converted into DC power, the DC power is converted into AC power, and the AC power is supplied to bypass input terminal T2 of each regular uninterruptible power supply device Un. When output voltage VI2 of bypass AC power supply PS2 is sufficiently high, VDC2>VL is satisfied, and output voltage VO2 of auxiliary power conversion device B1 is set to an AC voltage having a sinusoidal waveform with no waveform distortion, and is maintained at a voltage within the acceptable input voltage range of load LDn.

When output voltage VI2 of bypass AC power supply PS2 decreases and VDC2<VL is satisfied, output voltage VO2 of auxiliary power conversion device B1 is set to an AC voltage having waveform distortion within the acceptable range for load LDn, and is maintained at a voltage within the acceptable input voltage range of load LDn.

When inverter 8 has a failure in one regular uninterruptible power supply device Un, semiconductor switch 14 is turned on instantaneously, and the AC power generated by auxiliary power conversion device B1 is supplied to load LDn via semiconductor switch 14. Electromagnetic contactor 11 is turned off, electromagnetic contactor 15 is turned on, and thereafter semiconductor switch 14 is turned off. Thereby, the AC power generated by auxiliary power conversion device B1 is supplied to load LDn via electromagnetic contactor 15, and operation of load LDn is continued.

When regular uninterruptible power supply device Un is subjected to maintenance check, operating unit 16 is used to switch from the inverter power-feed mode to the bypass power-feed mode. Also in this case, semiconductor switch 14 is turned on, and the AC power generated by auxiliary power conversion device B1 is supplied to load LDn via semiconductor switch 14. Electromagnetic contactor 11 is turned off, electromagnetic contactor 15 is turned on, and thereafter semiconductor switch 14 is turned off. Thereby, the AC power generated by auxiliary power conversion device B1 is supplied to load LDn via electromagnetic contactor 15, and operation of load LDn is continued and regular uninterruptible power supply device Un is subjected to maintenance check.

When supply of the AC power from commercial AC power supply PS2 is stopped, that is, when a power failure occurs, while loads LD1 to LDN are driven by regular uninterruptible power supply devices U1 to UN, operation of converter 4 is stopped, the DC power in battery 6 is converted into AC power by inverter 8, and the AC power is supplied to load LDn, in each regular uninterruptible power supply device Un. Therefore, even when a power failure occurs, operation of load LDn can be continued for a period in which the DC power is stored in battery 6.

As described above, in the first embodiment, since auxiliary power conversion device B1 having a simple configuration which does not use a battery is provided, the size and the cost of the system can be reduced and the efficiency of the system can be improved, when compared with a conventional case where an auxiliary uninterruptible power supply device having the same configuration as that of regular uninterruptible power supply device Un is provided.

Further, even when DC voltage VDC2 generated by converter 24 decreases to be lower than predetermined lower limit voltage VL, auxiliary power conversion device B1 generates waveform distortion within the acceptable range for load LDn in AC voltage VO2, and outputs AC voltage VO2 within the acceptable input voltage range of load LDn. Therefore, operation of load LDn can be continued even when the AC voltage supplied from bypass AC power supply PS2 varies.

It should be noted that, when DC power VDC2 decreases to be lower than lower limit voltage VL, waveform distortion may further be generated in output voltage VO2 of auxiliary power conversion device B1 by reducing the switching frequency of turning on/off switching elements S31 to S36 of inverter 27. In this case, since the number of times of turning on/off switching elements S31 to S36 of inverter 27 is reduced, switching loss in switching elements S31 to S36 can be reduced, and efficiency n of auxiliary power conversion device B1 can be further improved.

Second Embodiment

Figure 8:
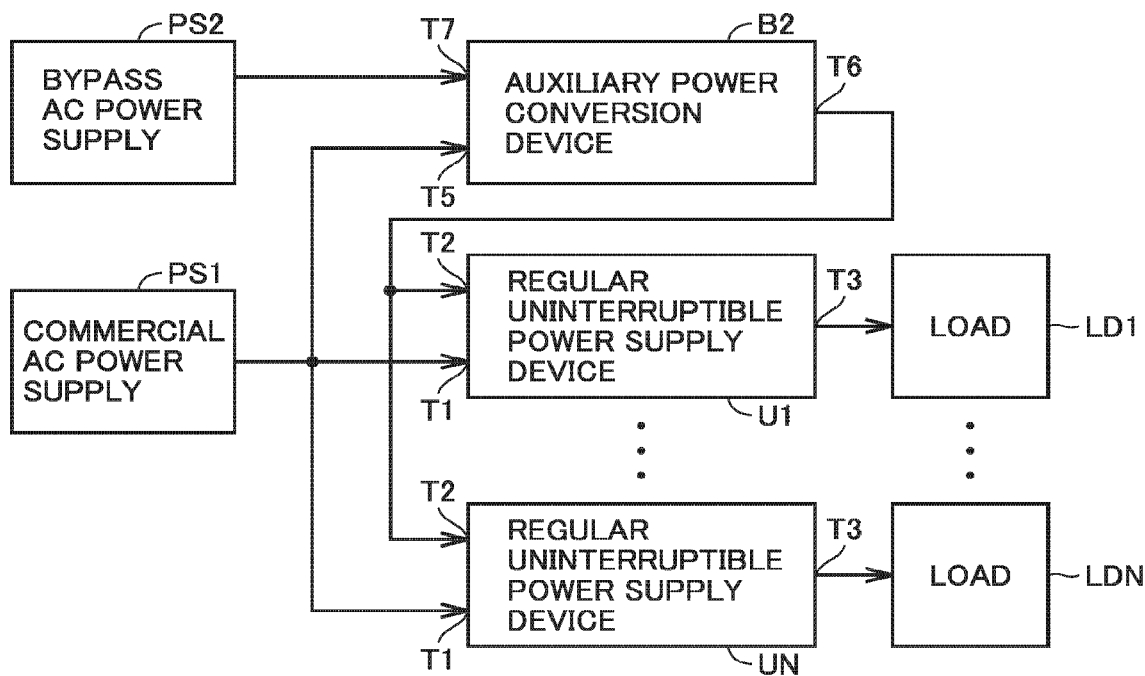
FIG. 8 is a block diagram showing a configuration of an uninterruptible power supply system in accordance with a second embodiment of the present invention.

FIG. 8 is a block diagram showing a configuration of an uninterruptible power supply system in accordance with a second embodiment of the present invention, and is a view compared with FIG. 1. Referring to FIG. 8, this uninterruptible power supply system is different from the uninterruptible power supply system of FIG. 1 in that auxiliary power conversion device B1 is replaced with an auxiliary power conversion device B2. Auxiliary power conversion device B2 includes AC input terminal T5 which receives AC power from commercial AC power supply PS1, a bypass input terminal T7 which receives AC power from bypass AC power supply PS2, and AC output terminal T6 connected to bypass input terminals T2 of regular uninterruptible power supply devices U1 to UN.

Figure 9:
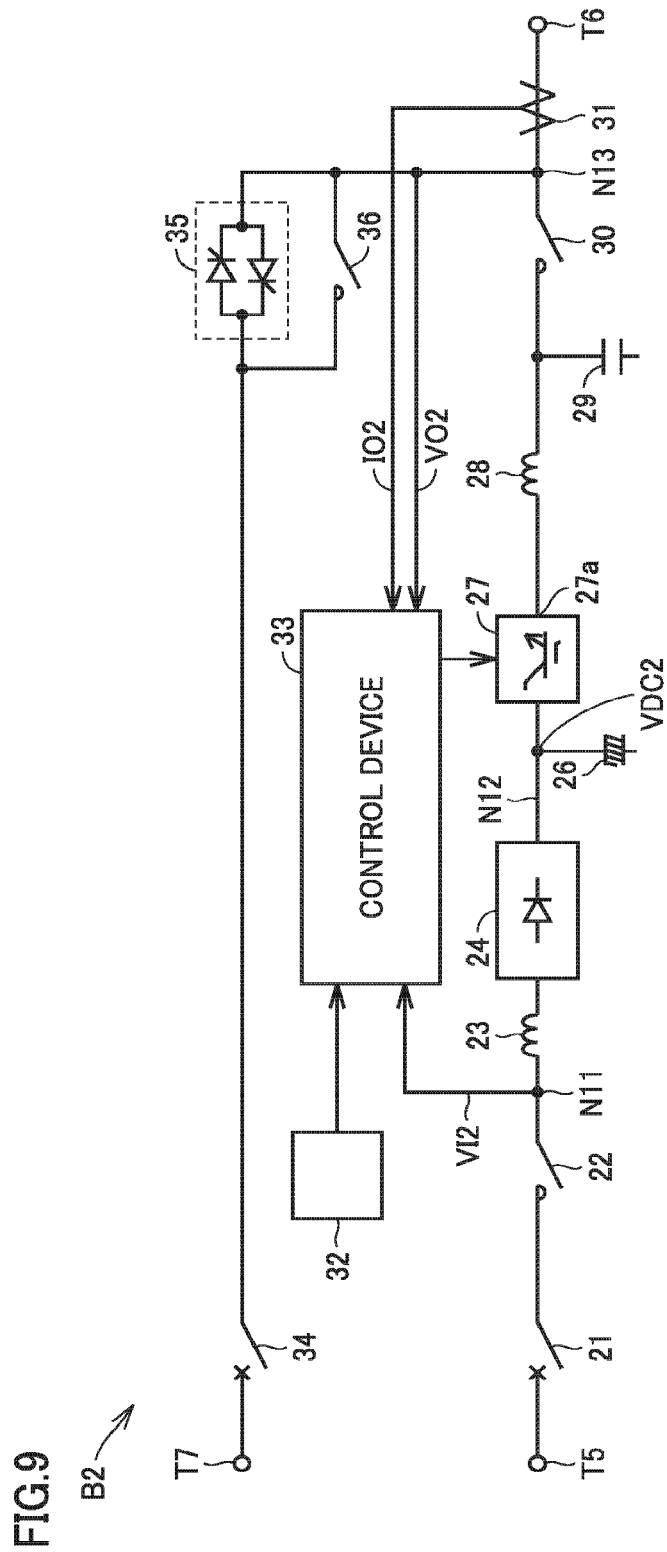
FIG. 9 is a circuit block diagram showing a configuration of an auxiliary power conversion device shown in FIG. 8.

FIG. 9 is a circuit block diagram showing a configuration of auxiliary power conversion device B2, and is a view compared with FIG. 4. Referring to FIG. 9, auxiliary power conversion device B2 is different from auxiliary power conversion device B1 of FIG. 4 in that bypass input terminal T7, a breaker 34, a semiconductor switch 35, and an electromagnetic contactor 36 are added thereto. Since AC input terminal T5 receives an output voltage of commercial AC power supply PS1, control device 33 controls inverter 27 in synchronization with the output voltage of commercial AC power supply PS1. Therefore, a phase of output voltage VO2 of auxiliary power conversion device B2 is the same as a phase of the output voltage of commercial AC power supply PS1.

Breaker 34 and semiconductor switch 35 are connected in series between bypass input terminal T7 and node N13. Breaker 34 is turned on when auxiliary power conversion device B2 is used, and is turned off for example when auxiliary power conversion device B2 is subjected to maintenance check. Semiconductor switch 35 includes a thyristor, and is controlled by control device 33. Semiconductor switch 35 is normally turned off, and is turned on instantaneously when inverter 27 has a failure, to pass the AC power from bypass AC power supply PS2 to AC output terminal T6. Semiconductor switch 35 is turned off after a predetermined time elapses since it is turned on.

Electromagnetic contactor 36 is connected in parallel with semiconductor switch 35, and is controlled by control device 33. Electromagnetic contactor 36 is turned off in the inverter power-feed mode in which the AC power generated by inverter 27 is provided to AC output terminal T6, and is turned on in the bypass power-feed mode in which the AC power from bypass AC power supply PS2 is provided to AC output terminal T6.

Further, when inverter 27 has a failure, electromagnetic contactor 36 is turned on to provide the AC power from bypass AC power supply PS2 to AC output terminal T6. That is, when inverter 27 has a failure, semiconductor switch 35 is turned on instantaneously for a predetermined time, and electromagnetic contactor 36 is turned on, to prevent semiconductor switch 35 from being overheated and damaged. Through the user's operation of operating unit 32, either of the inverter power-feed mode and the bypass power-feed mode can also be manually selected. Since other components and operations are the same as those in the first embodiment, the description thereof will not be repeated.

In the second embodiment, the same effect as that in the first embodiment can be obtained. In addition, even when inverter 27 of auxiliary power conversion device B2 has a failure, operation of load LDn can be continued by supplying the AC power from bypass AC power supply PS2 to load LDn.

It should be noted that, in a case where the phase of the output voltage of commercial AC power supply PS1 is different from a phase of an output voltage of bypass AC power supply PS2, when switching from the inverter power-feed mode to the bypass power-feed mode is performed, it is preferable to control inverter 27 to match the phase of output voltage VO2 with the phase of the output voltage of bypass AC power supply PS2, and thereafter turn off electromagnetic contactor 30 and turn on electromagnetic contactor 36.

When switching from the bypass power-feed mode to the inverter power-feed mode is performed, it is preferable to control inverter 27 to match the phase of output voltage VO2 with the phase of the output voltage of bypass AC power supply PS2, and thereafter turn off electromagnetic contactor 36 and turn on electromagnetic contactor 30, and then gradually change the phase of output voltage VO2 to match it with the phase of the output voltage of commercial AC power supply PS1. This can prevent flowing of an overcurrent and unstable operation of load LDn.

Third Embodiment

Figure 10:
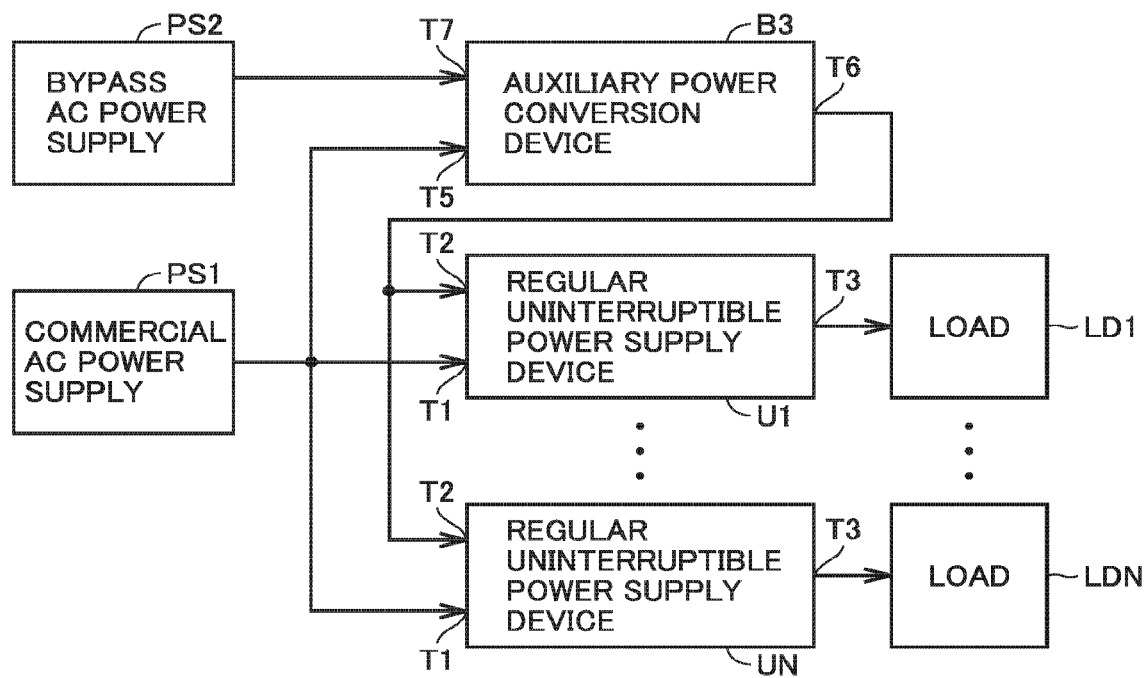
FIG. 10 is a block diagram showing a configuration of an uninterruptible power supply system in accordance with a third embodiment of the present invention.

FIG. 10 is a block diagram showing a configuration of an uninterruptible power supply system in accordance with a third embodiment of the present invention, and is a view compared with FIG. 8. Referring to FIG. 10, this uninterruptible power supply system is different from the uninterruptible power supply system of FIG. 8 in that auxiliary power conversion device B2 is replaced with an auxiliary power conversion device B3.

Figure 11:
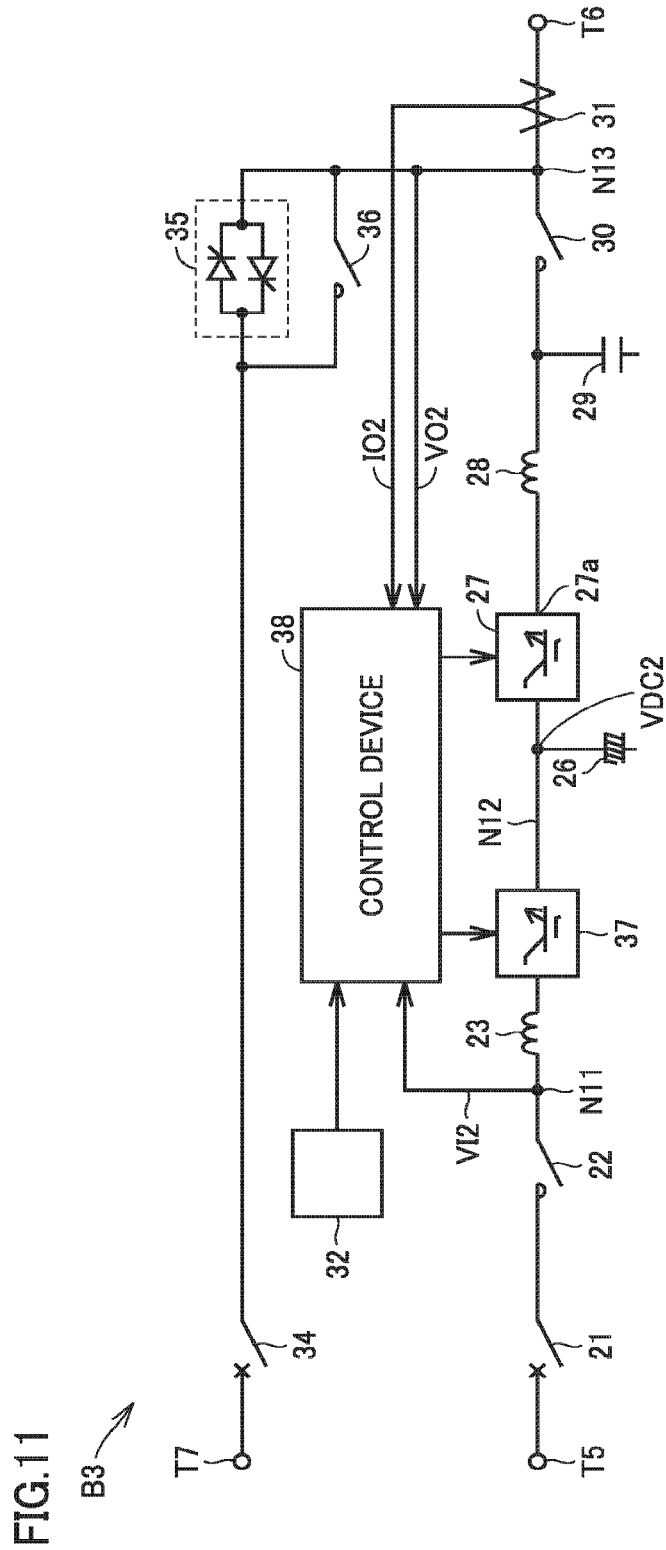
FIG. 11 is a circuit block diagram showing a configuration of an auxiliary power conversion device shown in FIG. 10.

FIG. 11 is a circuit block diagram showing a configuration of auxiliary power conversion device B3, and is a view compared with FIG. 9. Referring to FIG. 11, auxiliary power conversion device B3 is different from auxiliary power conversion device B2 of FIG. 9 in that converter 24 and control device 33 are replaced with a converter 37 and a control device 38, respectively.

Control device 38 controls converter 37 in synchronization with input voltage VI2 (an output voltage of commercial AC power supply PS1). Converter 37 is controlled by control device 38, converts AC power from commercial AC power supply PS1 into DC power, and outputs the DC power to power supply node N12. Converter 37 outputs DC voltage VDC2 at a level according to an amplitude of input voltage VI2.

Figure 12:
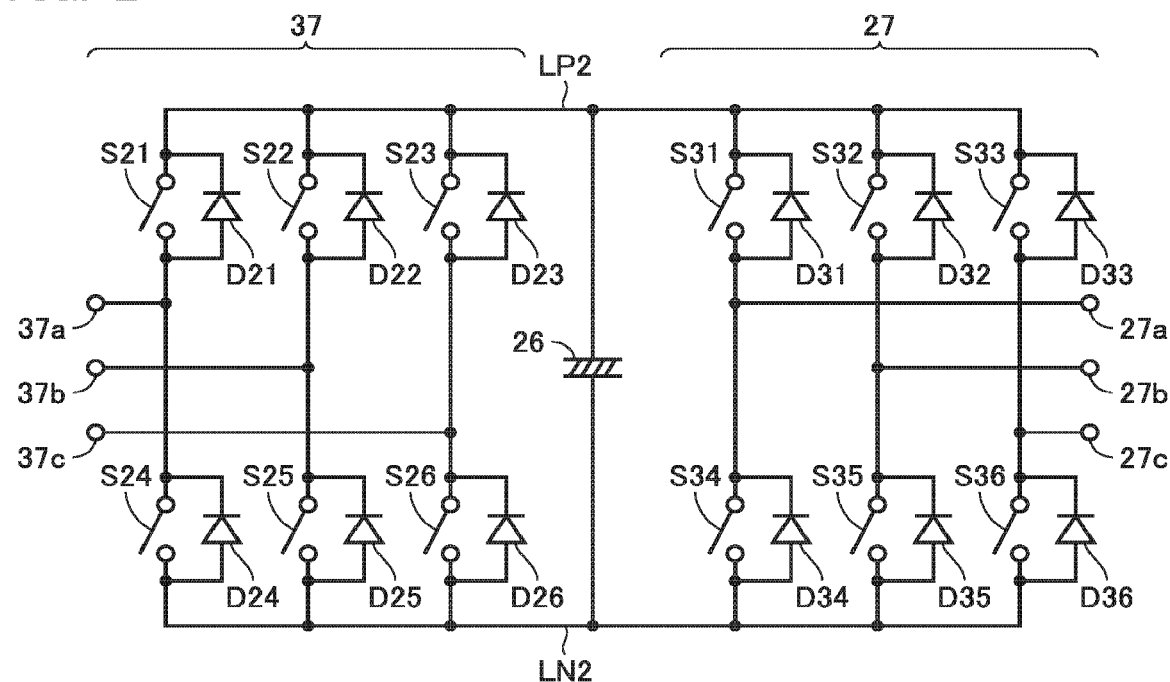
FIG. 12 is a circuit diagram showing a configuration of a converter and an inverter shown in FIG. 11.

FIG. 12 is a circuit diagram showing a configuration of converter 37 and inverter 27, and is a view compared with FIG. 5. Inverter 27 has the same configuration as that shown in FIG. 5. Converter 37 includes input nodes 37a to 37c, switching elements S21 to S26, and diodes D21 to D26.

Input nodes 37a to 37c of converter 37 receive three-phase AC voltages from commercial AC power supply PS1, respectively. Switching elements S21 to S23 have one electrodes connected to DC positive bus LP2, and the other electrodes connected to input nodes 37a to 37c, respectively. Switching elements S24 to S26 have one electrodes connected to input nodes 37a to 37c, respectively, and the other electrodes connected to DC negative bus LN2. Diodes D21 to D26 are connected in anti-parallel with switching elements S21 to S26, respectively. Smoothing electrolytic capacitor 26 is connected between DC positive bus LP2 and DC negative bus LN2 to smooth DC voltage VDC2 between buses LP2 and LN2.

Each of switching elements S21 to S26 is controlled by control device 38, and is turned on/off at a predetermined timing in synchronization with three-phase AC voltage VI2 from commercial AC power supply PS1. Switching elements S21 to S23 are turned on/off in synchronization with three-phase AC voltage VI2, and when switching elements S21 to S23 are turned on/off, switching elements S24 to S26 are turned off/on, respectively. Thereby, DC voltage VDC2 at a level according to the amplitude of AC voltage VI2 is generated.

Output voltage VDC2 of converter 37 is higher than output voltage VDC2 of converter 24 in FIG. 9 by two times of the forward drop voltage of diode D. Therefore, a lower limit value of input voltage VI2 (the output voltage of commercial AC power supply PS1) with which load LDn can be driven can be decreased by that amount. Since other components and operations are the same as those in the second embodiment, the description thereof will not be repeated.

In the third embodiment, the same effect as that in the second embodiment can be obtained. In addition, the lower limit value of input voltage VI2 (the output voltage of commercial AC power supply PS1) with which load LDn can be driven can be decreased.

It should be noted that, although output voltage VDC2 of converter 37 is changed according to the level of the amplitude of input voltage VI2 in the third embodiment, the present invention is not limited thereto. When input voltage VI2 is higher than a predetermined value, output voltage VDC2 of converter 37 may be maintained at a constant value, and when input voltage VI2 is lower than the predetermined value, output voltage VDC2 of converter 37 may be set to a value as high as possible. By adjusting a difference between a phase of AC voltage VI2 and a phase of the timing at which switching elements S21 to S26 are turned on/off, DC voltage VDC2 of converter 37 can be adjusted to a desired value.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

U1 to UN: regular uninterruptible power supply device; B1 to B3: auxiliary power conversion device; PS1: commercial AC power supply; PS2: bypass AC power supply; LD1 to LDN: load; T1, T5: AC input terminal; T2, T7: bypass input terminal; T3, T6: AC output terminal; 1, 13, 21, 34: breaker; 2, 5, 11, 15, 22, 30, 36: electromagnetic contactor; 3, 9, 23, 28: AC reactor; 4, 24, 37: converter; 6: battery; 7, 26: smoothing electrolytic capacitor; 8, 27: inverter; 10, 29: capacitor; 12, 31: current detector; 14, 35: semiconductor switch; 16, 32: operating unit; 17, 33, 38: control device; S1 to S6, S11 to S16, S21 to S26, S31 to S36: switching element; D1 to D6, D11 to D16, D21 to D26, D31 to D36: diode.

The invention claimed is:

1. An uninterruptible power supply system, comprising:
a regular uninterruptible power supply device configured to (i) in a normal state where AC power is supplied from a first AC power supply, convert the AC power from the first AC power supply into DC power, store the DC power in a power storage device and convert the DC power into AC power, and supply the AC power to a load, and (ii) in a power failure state where supply of the AC power from the first AC power supply is stopped, convert the DC power in the power storage device into AC power and supplies the AC power to the load; and
an auxiliary power conversion device that does not use a battery and is configured to convert AC power supplied from a second AC power supply into DC power, convert the DC power into AC power, and supply the AC power to the load when the regular uninterruptible power supply device has a failure, wherein
the auxiliary power conversion device includes:
a first converter configured to convert the AC power supplied from the second AC power supply into DC power,
a first inverter configured to convert the DC power generated by the first converter into AC power, and
a first control device configured to control the first inverter such that:
(i) in a first case where a DC voltage generated by the first converter is higher than a predetermined voltage, an output voltage of the auxiliary power conversion device is set to an AC voltage having a sinusoidal waveform and falling within an acceptable input voltage range of the load; and
(ii) in a second case where the DC voltage generated by the first converter is lower than the predetermined voltage, the output voltage of the auxiliary power conversion device is set to an AC voltage having waveform distortion within an acceptable range for the load and falling within the acceptable input voltage range of the load, and
the first control device is configured to:
control the first inverter, in the first case, to output a sinusoidal AC voltage having an amplitude smaller than one-half of the DC voltage generated by the first converter; and
control the first inverter, in the second case, to output a sinusoidal AC voltage having an amplitude larger than one-half of the DC voltage generated by the first converter.

2. The uninterruptible power supply system according to claim 1, wherein the predetermined voltage is a minimum voltage required for the auxiliary power conversion device to output a lower limit AC voltage within the acceptable input voltage range of the load.

3. The uninterruptible power supply system according to claim 1, wherein the AC voltage having the waveform distortion has a trapezoidal waveform.

4. The uninterruptible power supply system according to claim 1, wherein the first control device is configured to decrease a switching frequency of the first inverter in the second case to be lower than a switching frequency of the first inverter in the first case.

5. The uninterruptible power supply system according to claim 1, wherein
the first converter includes a rectifier configured to rectify an AC voltage supplied from the second AC power supply, and
the first control device is configured to control the first inverter.

6. The uninterruptible power supply system according to claim 1, wherein
the first converter includes a plurality of switching elements configured to convert an AC voltage supplied from the second AC power supply into a DC voltage, and
the first control device is configured to control the first converter and the first inverter.

7. The uninterruptible power supply system according to claim 1, wherein the first control device is configured to control the first inverter such that a phase of the output voltage of the auxiliary power conversion device matches a phase of an output voltage of the regular uninterruptible power supply device.

8. An uninterruptible power supply system, comprising:
a regular uninterruptible power supply device configured to (i) in a normal state where AC power is supplied from a first AC power supply, convert the AC power from the first AC power supply into DC power, store the DC power in a power storage device and convert the DC power into AC power, and supply the AC power to a load, and (ii) in a power failure state where supply of the AC power from the first AC power supply is stopped, convert the DC power in the power storage device into AC power and supplies the AC power to the load; and an auxiliary power conversion device that does not use a battery and is configured to convert AC power supplied from a second AC power supply into DC power, convert the DC power into AC power, and supply the AC power to the load when the regular uninterruptible power supply device has a failure, wherein the auxiliary power conversion device includes:
  a first converter configured to convert the AC power supplied from the second AC power supply into DC power,
  a first inverter configured to convert the DC power generated by the first converter into AC power, and
  a first control device configured to control the first inverter such that:
    (i) in a first case where a DC voltage generated by the first converter is higher than a predetermined voltage, an output voltage of the auxiliary power conversion device is set to an AC voltage having a sinusoidal waveform and falling within an acceptable input voltage range of the load; and
    (ii) in a second case where the DC voltage generated by the first converter is lower than the predetermined voltage, the output voltage of the auxiliary power conversion device is set to an AC voltage having waveform distortion within an acceptable range for the load and falling within the acceptable input voltage range of the load, the regular uninterruptible power supply device includes:
  a second converter configured to convert the AC power supplied from the first AC power supply into DC power,
  a second inverter configured to convert the DC power into AC power, and
  a second control device configured to control the second converter and the second inverter such that an output voltage of the regular uninterruptible power supply device is set to a rated AC voltage having a sinusoidal waveform, and in the normal state, the DC power generated by the second converter is stored in the power storage device and is supplied to the second inverter, and in the power failure state, the DC power in the power storage device is supplied to the second inverter.

9. The uninterruptible power supply system according to claim 8, wherein the regular uninterruptible power supply device further includes a first switching circuit configured to receive the AC power generated by the second inverter and the AC power from the auxiliary power conversion device, provide the AC power generated by the second inverter to the load when the second inverter is not mal, and provide the AC power from the auxiliary power conversion device to the load when the second inverter has a failure.

10. The uninterruptible power supply system according to claim 9, wherein the auxiliary power conversion device further includes a second switching circuit configured to receive the AC power generated by the first inverter and AC power supplied from a third AC power supply, provide the AC power generated by the first inverter to the first switching circuit when the first inverter is normal, and provide the AC power supplied from the third AC power supply to the first switching circuit when the first inverter has a failure.

\* \* \* \* \*